с

US008541591B2

(12) United States Patent
Kato et al.

(10) Patent No.: US 8,541,591 B2
(45) Date of Patent: Sep. 24, 2013

(54) NANOPARTICLE/DISPERSANT COMPLEX, NANOPARTICLE DISPERSION LIQUID, AND NANOPARTICLE/MATRIX-MATERIAL COMPLEX

(75) Inventors: Jun Kato, Tucson, AZ (US); Tetsushi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/054,411

(22) PCT Filed: Jul. 27, 2009

(86) PCT No.: PCT/JP2009/063706
§ 371 (c)(1),
(2), (4) Date: Mar. 2, 2011

(87) PCT Pub. No.: WO2010/013822
PCT Pub. Date: Feb. 4, 2010

(65) Prior Publication Data
US 2011/0144061 A1 Jun. 16, 2011

(30) Foreign Application Priority Data

Jul. 28, 2008 (JP) ................................ 2008-194041
Jul. 2, 2009 (JP) ................................ 2009-158201

(51) Int. Cl.
*C07F 9/40* (2006.01)
*C07F 9/6506* (2006.01)

(52) U.S. Cl.
USPC .......................................... 548/112; 977/786

(58) Field of Classification Search
USPC ......................................... 548/112; 977/786
See application file for complete search history.

(56) References Cited

U.S. PATENT DOCUMENTS

| | | | |
|---|---|---|---|
| 3,824,192 | A | 7/1974 | Spivack et al. |
| 4,280,960 | A | 7/1981 | Nonn et al. |
| 7,560,051 | B2 | 7/2009 | Furusawa et al. |
| 7,767,115 | B2 | 8/2010 | Furusawa et al. |
| 2007/0027038 | A1 | 2/2007 | Kamimura et al. |
| 2009/0312457 | A1 | 12/2009 | Tokumitsu |

FOREIGN PATENT DOCUMENTS

| | | |
|---|---|---|
| JP | 2003-031270 A | 1/2003 |
| JP | 2005-213626 A | 8/2005 |
| JP | 2006-76831 A | 3/2006 |
| JP | 2006-282399 A | 10/2006 |
| JP | 2006-291347 A | 10/2006 |
| JP | 2007-254245 A | 10/2007 |
| JP | 2009-91663 A | 4/2009 |
| JP | 2009-173846 A | 8/2009 |
| WO | 2008/075784 A1 | 6/2008 |

OTHER PUBLICATIONS

Mal'tseva et al. CAS Accession No. 1989:173344.*
Lugovkin, B. P. "Reaction of 6-monohalomethylquinolines with sodium salts of dialkyl phosphorus acids" 1957, CAS Accession No. 1957:85714.*
Amanda C. Cole et al., "Novel Bronsted Acidic Ionic Liquids and Their Use as Dual Solvent-Catalysts," 124 J. Am. Chem. Soc. 5962-5963 (May 2002).
Hiroyuki Ohno et al., "New Type of Polymer Gel Electrolyte: Zwitterionic Liquid/Polar Polymer Mixture," 48 Electrochilnica Acta 2079-2083 (Jun. 2003).
P. Davide Cozzoli et al., "Low-Temperature Synthesis of Soluble and Processable Organic-Capped Anatase TiO2 Nanorods," 125 J. Am. Chem. Soc. 14539-14548 (Oct. 2003).
Joachim Spatz et al., "Controlled Mineralization and Assembly of Hydrolysis-Based Nanoparticles in Organic Solvents Combining Polymer Micelles and Microwave Techniques," 10(6) Adv. Mater. 473-475 (1998).
Office Action in Japanese Application No. 2009-158201 (Jul. 31, 2012).
Teddy G. Traylor et al., "Geminate Processes in the Reaction of Nitric Oxide with 1-Methylimidazole-Iron(II) Porphyrin Complexes. Steric, Solvent Polarity, and Viscosity Effects," 115 J. Am. Chem. Soc. 4808-4813 (1993).
Yousef R. Mirzaei et al., "Syntheses of 1-Alkyl-1,2,4-triazoles and the Formation of Quaternary 1-Alkyl-4-polyfluoroalkyl-1,2,4-triazolium Salts Leading to Ionic Liquids," 67 J. Org. Chem. 9340-9345 (Nov. 2002).
C. E. Dreef et al., "An Approach Towards the Formation of an Ester Bond Between the Primary Hydroxyl of a β-D-Galactopyranoside and 2-Aminoethylphosphonic Acid and its N-Methyl Substituted Derivatives," 29(10) Tetrahedron Letters 1199-1202 (1988).
Yoffi Segall et al., "Composition of Technical Ethephon [(2-Chloroethyl)phosphonic Acid] and Some Analogues Relative to Their Reactivity and Biological Activity," 39 J. Agric. Food Chem. 380-385 (1991).
Masahiro Yoshizawa et al., "Ion Conduction in Zwitterionic-type Molten Salts and Their Polymers," 11 J. Mater. Chem. 1057-1062 (Mar. 2001).

* cited by examiner

*Primary Examiner* — Joseph Kosack
(74) *Attorney, Agent, or Firm* — Fitzpatrick, Cella, Harper & Scinto

(57) ABSTRACT

Provided are a nanoparticle/dispersant complex having excellent dispersibility and long-term stability in a dispersion medium, a production method therefor, and a nanoparticle dispersion liquid and a nanoparticle/matrix-material complex which are colorless and transparent even at high concentrations. In the nanoparticle/dispersant complex, a nanoparticle is covered with a dispersant containing a heterocyclic cationic group and one of an oxo acid group containing a sulfur atom or a phosphorus atom and an anion moiety of the oxo acid group; in the nanoparticle dispersion liquid, the nanoparticle/dispersant complex is dispersed into a dispersion medium; in the nanoparticle/matrix-material complex, the nanoparticle/dispersant complex is dispersed into a matrix material; and the production method for a nanoparticle/dispersant complex comprises forming, under a presence of the dispersant, a nanoparticle covered with the dispersant from a nanoparticle precursor.

4 Claims, No Drawings

NANOPARTICLE/DISPERSANT COMPLEX, NANOPARTICLE DISPERSION LIQUID, AND NANOPARTICLE/MATRIX-MATERIAL COMPLEX

TECHNICAL FIELD

The present invention relates to a nanoparticle/dispersant complex, a nanoparticle dispersion liquid, and a nanoparticle/matrix-material complex. Further, the present invention relates to a production method for a nanoparticle/dispersant complex.

BACKGROUND ART

A complex material in which inorganic compound particles are dispersed into a matrix material such as solvent, resin, glass, or ceramic may be provided with properties such as an optical property, a thermal property, a mechanical property, an electrical property, and a magnetic property, those of which may not be achieved by the matrix material alone. Therefore, the complex material has been put to practical use for various applications.

In particular, when inorganic nanoparticles are used, a specific function or property attributed to the size thereof may be imparted, and hence, the inorganic nanoparticles have been attracting attention in various fields.

For example, in the case where inorganic nanoparticles having high refractive index are uniformly dispersed into a matrix material, visible light is scattered and the resultant looks clouded when nanoparticles each having a particle diameter larger than several tens of nanometers are used, but it is expected that an optical material having high transparency and high refractive index with suppressed light scattering may be obtained by using nanoparticles each having a particle diameter smaller than several tens of nanometers. Consequently, the inorganic nanoparticles and an optical material obtained by dispersing the inorganic nanoparticles into a film or a lens have been studied as a material whose light scattering, refractive index, and the like are adjustable.

In a practical sense, however, the nanoparticles are extremely unstable when used alone, and easily aggregate to enlarge the particle diameters thereof even when the surface is covered with various substances, and hence, it has been difficult to realize a nanoparticle/matrix-material complex for the optical applications.

As a way to avoid the above problem, there is described, in P. D. Cozzoli et al., J. Am. Chem. Soc., 125, 14539-14548 (2003), a method of producing metal oxide nanoparticles by an in-situ surface modification nanoparticle synthesis, which involves performing surface modification of a metal oxide simultaneously with crystallization of the metal oxide. However, although the nanoparticles of several nanometers and the dispersion liquid thereof has been produced, a colorless transparent nanoparticle dispersion liquid has not been produced at high concentrations of several tens of wt %.

Further, as a high-concentration nanoparticle dispersion liquid, there is described in Japanese Patent Application Laid-Open No. 2007-254245 a high-concentration water-dispersion liquid of metal oxide nanoparticles, the nanoparticles being covered with a dispersant having a heterocyclic type cationic group. In Japanese Patent Application Laid-Open No. 2007-254245, however, although there is described that the nanoparticle dispersion liquid is excellent in dispersibility and long-term stability in water, there is no description on the dispersibility and the long-term stability of the nanoparticle dispersion liquid in an organic solvent or in a polymer. Further, it may be presumed that a nanoparticle dispersion liquid at high concentrations equal to or more than several tens of wt % is insufficient in its transparency and suppression of coloring. In addition, the method according to Japanese Patent Application Laid-Open No. 2007-254245 involves dispersing commercially-available nanoparticles into water by being covered with a dispersant, and hence, an increase in particle diameter due to the aggregation during the production process may not be avoided.

DISCLOSURE OF THE INVENTION

The present invention is made in view of the above background art, and provides a nanoparticle/dispersant complex having excellent dispersibility and long-term stability in a dispersion medium, and a nanoparticle dispersion liquid and a nanoparticle/matrix-material complex which are colorless and transparent even at high concentrations.

Further, an object of the present invention is to provide a method of easily producing the nanoparticle/dispersant complex.

Further, an object of the present invention is to provide a novel phosphorus compound containing a nitrogen-containing aromatic heterocyclic cationic group, which may be used as the dispersant.

A nanoparticle/dispersant complex that solves the above problems comprises a nanoparticle covered with at least one dispersant represented by the following formula (1) or (2):

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, and $Y^-$ represents an anion moiety of an oxo acid group containing a sulfur atom or a phosphorus atom,

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, YH represents an oxo acid group containing a sulfur atom or a phosphorus atom, and $X^-$ represents an anion produced by dissociation of a proton from a protonic acid.

In the nanoparticle dispersion liquid that solves the above problems, the nanoparticle/dispersant complex is dispersed into a dispersion medium.

In the nanoparticle/matrix-material complex that solves the above problems, the nanoparticle/dispersant complex is dispersed into a matrix material.

The production method for a nanoparticle/dispersant complex comprises forming, under a presence of at least one dispersant represented by the following formula (1) or (2), a nanoparticle covered with the dispersant from a nanoparticle precursor:

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, and $Y^-$ represents an anion moiety of an oxo acid group containing a sulfur atom or a phosphorus atom,

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, YH represents an oxo acid group containing a sulfur atom or a phosphorus atom, and $X^-$ represents an anion produced by dissociation of a proton from a protonic acid.

Further, the production method for a nanoparticle/dispersant complex that solves the above problems comprises bringing a nanoparticle and at least one dispersant represented by the formula (1) or (2) into contact with each other so that the nanoparticle is covered with the dispersant.

Further, the present invention relates to a phosphorus compound containing a nitrogen-containing aromatic heterocyclic cationic group represented by the following formula (3):

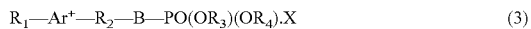

$$R_1-Ar^+-R_2-B-PO(OR_3)(OR_4).X \quad (3)$$

where $Ar^+$ represents a nitrogen-containing aromatic heterocyclic cationic group, B represents a single bond or an oxygen atom, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, $R_3$ represents a hydrogen atom or a substituted or unsubstituted alkyl group having 1 to 10 carbon atoms, $R_4$ represents a hydrogen atom or a substituted or unsubstituted alkyl group having 1 to 10 carbon atoms, and $X^-$ represents an anion produced by dissociation of a proton from a protonic acid.

Further, the present invention relates to a production method for the phosphorus compound containing a nitrogen-containing aromatic heterocyclic cationic group, comprising reacting a compound represented by the following formula (5) with a compound represented by the following formula (6):

$$R_1-Ar \quad (5)$$

where Ar represents a nitrogen-containing aromatic heterocyclic group and $R_1$ represents a hydrogen atom or a substituted or unsubstituted alkyl group having 1 to 30 carbon atoms,

$$X-R_2-B-PO(OR_3)(OR_4) \quad (6)$$

where B represents a single bond or an oxygen atom, $R_2$ represents a single bond or a substituted or unsubstituted alkylene group having 1 to 30 carbon atoms, $R_3$ represents a hydrogen atom or a substituted or unsubstituted alkyl group having 1 to 10 carbon atoms, $R_4$ represents a hydrogen atom or a substituted or unsubstituted alkyl group having 1 to 10 carbon atoms, and X represents a group capable of becoming an anion moiety of a protonic acid as $X^-$.

According to the present invention, there may be provided the nanoparticle/dispersant complex having excellent dispersibility and long-term stability in a dispersion medium, and the nanoparticle dispersion liquid and the nanoparticle/matrix-material complex which are colorless and transparent even at high concentrations.

Further, the present invention may provide the method of easily producing the nanoparticle/dispersant complex.

Further, in the present invention, there may be provided the novel phosphorus compound containing a nitrogen-containing aromatic heterocyclic cationic group, which may be used as the dispersant.

Further features of the present invention will become apparent from the following description of exemplary embodiments.

BEST MODE FOR CARRYING OUT THE INVENTION

Preferred embodiments of the present invention will now be described in detail.

A nanoparticle/dispersant complex according to the present invention comprises a nanoparticle covered with at least one dispersant represented by the following formula (1) or (2):

$$R_1-A^+-R_2-Y^- \quad (1)$$

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, and $Y^-$ represents an anion moiety of an oxo acid group containing a sulfur atom or a phosphorus atom,

$$R_1-A^+-R_2-YH.X^- \quad (2)$$

where $A^+$ represents a heterocyclic cationic group, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, YH represents an oxo acid group containing a sulfur atom or a phosphorus atom, and $X^-$ represents an anion produced by dissociation of a proton from a protonic acid.

In the present invention, the dispersant refers to a compound which covers the nanoparticles so as to surround the surfaces of the nanoparticles thereby forming a complex with nanoparticles, and then improves the dispersibility of the nanoparticles into a dispersion medium or a matrix-material. Note that the term "to cover" used in the description of the present invention is a concept that also includes "surface modification".

As the heterocyclic cationic group ($A^+$) of the dispersant formed of the compound represented by the formula (1) or (2), there are exemplified an imidazolium group, a pyrazolium group, a triazolium group, and a pyridinium group. Introducing the heterocyclic cationic group into the dispersant facilitates formation of a positively charged layer as an outer shell of the nanoparticle, and hence, the aggregation can be suppressed owing to mutual charge repulsion between the nanoparticle dispersant complexes to improve the dispersibility. Further, because the functional group of the above kind efficiently absorbs a microwave, the effects of rapid rise in temperature and reduction in reaction time are easily exhibited when used in a nanoparticle synthesis using a microwave.

The heterocyclic cationic group of the dispersant is preferably an imidazolium cation.

The $R_1$ group of the dispersant represents preferably a hydrogen atom or an alkyl group having 1 to 30 carbon atoms, more preferably an alkyl group having 4 to 30 carbon atoms, still more preferably an alkyl group having 8 to 30 carbon atoms, and particularly preferably an alkyl group having 8 to 20 carbon atoms. As the length of the $R_1$ group is increased, steric hindrance between the nanoparticle/dispersant complexes becomes large, which may suppress the aggregation and improve the dispersibility. Further, when the length of the $R_1$ group is increased too much, only the cost of a raw material increases and the steric hindrance does not increase any more. Note that the alkyl group may be unsubstituted or may be substituted with at least one substituent selected from a polymerizable group, a functional group, a halogen group, a hydrocarbon group, and the like. Further, a part of the skeleton of the alkyl group may contain at least one unsaturated group.

As for the $R_2$ group of the dispersant, $R_2$ represents preferably a single bond or a substituted or unsubstituted alkylene group having 1 to 30 carbon atoms, more preferably an alkylene group having 2 to 20 carbon atoms, still more preferably an alkylene group having 2 to 8 carbon atoms, and particularly preferably an alkylene group having 2 to 4 carbon atoms. Here, the single bond of the $R_2$ group refers to a condition where the heterocyclic cationic group ($A^+$) and an oxo acid group or an anion moiety of the oxo acid group (YH or $Y^-$) are directly bonded to each other. Note that the alkylene group is preferably unsubstituted, but may be substituted with at least one substituent selected from a polymerizable group, a functional group, a halogen group, a hydrocarbon group, and the like. Further, a part of the skeleton of the alkylene group may contain at least one unsaturated group.

The YH group and the $Y^-$ group of the dispersant preferably represent an oxo acid group containing a sulfur atom or a phosphorus atom and an anion moiety of the oxo acid group containing a sulfur atom or a phosphorus atom, respectively. Examples of Y include $SO_3$, $SO_2$, $OPO_2(OH)$, $OPO_2(OR)$, $PO_2(OH)$, $PO_2(OR)$, $PHO_2$, and $PRO_2$ (R represents a hydrocarbon group or a polyalkylether group, for example). Those oxo acid groups have relatively strong interaction with nanoparticles, and hence, the nanoparticles are easily covered with the dispersant and the stability of the nanoparticles may be improved. Further, because it is not easy to form a complex having absorption in the visible wavelength region, the coloring of each of the nanoparticle/dispersant complex, the nanoparticle dispersion liquid, and the nanoparticle/matrix-material complex may be suppressed.

Y of the dispersant preferably represents at least one $SO_3$ and $PO_2(OH)$.

$X^-$ of the dispersant is not particularly limited as long as $X^-$ represents an anion moiety of a protonic acid, and preferred is an anion moiety of a strong protonic acid. Examples of $X^-$ include: an anion moiety of a strong inorganic acid such as $Cl^-$, $Br^-$, $I^-$, $BF_4^-$, $PF_6^-$, $AsF_6^-$, or $SbF_6^-$; an anion moiety of sulfonic acid such as $CF_3SO_3^-$, $CF_3CF_2SO_3^-$, $CF_3(CF_2)_3SO_3^-$, $CF_3(CF_2)_7SO_3^-$, $CCl_3SO_3^-$, or $CH_3C_6H_4SO_3^-$; and an anion moiety of sulfonimide such as $(CF_3SO_2)_2N^-$. Note that, in the case of dispersing the nanoparticles into an organic solvent or a resin, it is preferred that $X^-$ be an anion moiety of an organic protonic acid such as the anion moiety of sulfonic acid or the anion moiety of sulfonimide.

When the dispersant of the present invention is used, there may be expected an effect of improvement in dispersibility owing to a surfactant-like hydrophobic-component/hydrophilic-component compatibilizing function as a whole dispersant molecule, in addition to the above-mentioned considerable suppression of aggregation and improvement in dispersibility owing to the synergistic effect of the charge repulsion and the steric hindrance, rapid rise in temperature and reduction in reaction time owing to the microwave absorbing function, and coloring suppressing function. Therefore, there can be synthesized the nanoparticle dispersion liquid and the nanoparticle/matrix-material complex which are colorless and transparent even at high concentrations.

Specific examples of the dispersant formed of the compound represented by the above formula (1) or (2) include a sulfonate-anion-group-containing imidazolium salt compound (such as 3-(3-hexadecyl-1-imidazolio)-1-propanesulfonate), a sulfonic-acid-group-containing imidazolium salt compound (such as 3-(3-hexadecyl-1-imidazolio)-1-propanesulfonic acid triflate), a sulfonate-anion-group-containing pyrazolium salt compound (such as 3-(2-hexadecyl-1-pyrazolio)-1-propanesulfonate), a sulfonic-acid-group-containing pyrazolium salt compound (such as 3-(2-hexadecyl-1-pyrazolio)-1-propanesulfonic acid triflate), a sulfonate-anion-group-containing triazolium salt compound (such as 3-(3-octyl-1-triazolio)-1-butane sulfonate), a sulfonic-acid-group-containing triazolium salt compound (such as 3-(3-octyl-1-triazolio)-1-butanesulfonic acid triflate), a sulfonate-anion-group-containing pyridinium salt compound (such as 3-(4-octyl-1-pyridinio)-1-propanesulfonate), and a sulfonic-acid-group-containing pyridinium salt compound (such as 3-(4-octyl-1-pyridinio)-1-propanesulfonic acid triflate).

In addition, examples of the dispersant having another oxo acid group or an anion moiety thereof include a phosphonate-anion-group-containing imidazolium salt compound, a phosphonic-acid-group-containing imidazolium salt compound, a phosphate-anion-group-containing imidazolium salt compound, a phosphoric-acid-group-containing imidazolium salt compound, a phosphonate-anion-group-containing pyrazolium salt compound, a phosphonic-acid-group-containing pyrazolium salt compound, a phosphate-anion-group-containing pyrazolium salt compound, a phosphoric-acid-group-containing pyrazolium salt compound, a phosphonate-anion-group-containing triazolium salt compound, a phosphonic-acid-group-containing triazolium salt compound, a phosphate-anion-group-containing triazolium salt compound, a phosphoric-acid-group-containing triazolium salt compound, a phosphonate-anion-group-containing pyridinium salt compound, a phosphonic-acid-group-containing pyridinium salt compound, a phosphate-anion-group-containing pyridinium salt compound, and a phosphoric-acid-group-containing pyridinium salt compound.

Those dispersants may be used in combination of two or more kinds thereof.

As for the nanoparticle of the present invention, the kind thereof is not particularly limited, and in the case of being used for optical applications where colorless transparency is required, an oxide particle is preferred, and a metal oxide particle is more preferred.

Examples of the nanoparticle include metal oxides such as titanium oxide ($TiO_2$), zirconium oxide ($ZrO_2$), aluminum oxide ($Al_2O_3$), niobium oxide ($Nb_2O_5$), tin oxide ($SnO_2$), antimony oxide ($Sb_2O_5$), zinc oxide (ZnO), silicon oxide ($SiO_2$), indium tin oxide (ITO), lanthanum oxide ($La_2O_3$), cerium oxide ($CeO_2$), and hafnium oxide ($HfO_2$). However, the nanoparticle is not particularly limited to those kinds.

Of those metal oxides, preferred is at least one kind selected from the group consisting of titanium oxide, aluminum oxide, and zirconium oxide.

Those nanoparticles may be used in combination of two or more kinds thereof.

As the nanoparticle, it is desired to use a nanoparticle having a particle diameter sufficiently smaller than the wavelength of light in the case of being used for an optical lens or an optical film where high transparency is required, because the transparency deteriorates under influence of light scattering when the particle diameter increases. Therefore, the particle diameter (volume average particle diameter) of the nanoparticle of the present invention is preferably 50 nm or less, more preferably 20 nm or less, still more preferably 10 nm or less, and most preferably 6 nm or less.

The content ratio of the nanoparticles to the dispersant represented by the formula (1) or (2) in the nanoparticle/dispersant complex of the present invention is as follows. With respect to the nanoparticles, the content of the dispersant is preferably 0.001-fold mole or more and 100-fold mole or less and more preferably 0.01-fold mole or more and 10-fold mole or less. When the ratio is set to the above range, the surfaces of the nanoparticles are moderately covered with the dispersant, whereby the dispersibility of the nanoparticles contained in a dispersion medium or a matrix material can be improved.

In the nanoparticle dispersion liquid according to the present invention, the nanoparticle/dispersant complex is dispersed into a dispersion medium.

The dispersion medium of the present invention is not particularly limited as long as the dispersion medium is a liquid that uniformly disperses the nanoparticle/dispersant complex thereinto.

The dispersion medium is preferably an organic compound. Use of a dispersion medium in the nanoparticle dispersion liquid facilitates compatibilization with a resin or a polymerizable organic compound, and hence, in the case of producing a nanoparticle/matrix-material complex, the production process thereof may be simplified.

Examples of the dispersion medium include alcohols such as methanol, ethanol, propanol, butanol, hexanol, and octanol, acetonitrile, acetone, tetrahydrofuran, dimethylformamide, dimethylsulfoxide, toluene, hexane, chloroform, and dichloromethane.

The content of the nanoparticle/dispersant complex in the nanoparticle dispersion liquid according to the present invention is preferably 0.01 wt % or more and 99 wt % or less and more preferably 0.01 wt % or more and 60 wt % or less.

In the case of isolating the nanoparticle/dispersant complex from the nanoparticle dispersion liquid, it is preferred that the boiling point of the dispersion medium be 100° C. or lower under reduced pressure and it is more preferred that the boiling point of the dispersion medium be 100° C. or lower at normal pressure.

In the case where the nanoparticle dispersion liquid is used in applications where long-term stability is required, such as a high refractive index liquid, it is preferred that the dispersion medium have low volatility.

Those dispersion media may be used in combination of two or more kinds thereof.

In addition, the dispersion medium is preferably a polymerizable organic compound. When such dispersion medium is used, the nanoparticle dispersion liquid can be directly used for a polymerization process, and hence, in the case of producing a nanoparticle/matrix-material complex, the production process thereof may be simplified.

Examples of the polymerizable organic compound include (meth)acrylic compounds such as methyl (meth)acrylate, ethyl(meth)acrylate, butyl(meth)acrylate, cyclohexyl(meth) acrylate, isobornyl(meth)acrylate, phenyl (meth)acrylate, benzyl(meth)acrylate, 2-ethylhexyl (meth)acrylate, and 2-hydroxyethyl(meth)acrylate and vinyl compounds such as vinyl acetate, vinyl propionate, (meth)acrylonitrile, vinyl phthalimide, vinyl pyrrolidone, vinyl carbazole, styrene, α-methyl styrene, and p-methyl styrene.

In addition, as the polymerizable organic compound, a polymerizable organic compound having multiple polymerizable groups may be used. Examples thereof include ethylene glycol di(meth)acrylate, diethylene glycol di(meth)acrylate, triethylene glycol di(meth)acrylate, propylene glycol di(meth)acrylate, glycerol di(meth)acrylate, trimethylolpropane di(meth)acrylate, trimethylolpropane tri(meth)acrylate, pentaerythritol di(meth)acrylate, pentaerythritol tri(meth) acrylate, pentaerythritol tetra(meth)acrylate, dipentaerythritol hexa(meth)acrylate, dimethyloltricyclodecane diacrylate, bisphenol di(meth)acrylate, isocyanuric acid di(meth)acrylate, N,N'-methylene bis(meth)acrylamide, trimethylolpropane di(meth)allyl ether, pentaerythritol tri(meth)allyl ether, tetra(meth)allyloxyethane, and divinylbenzene.

Those polymerizable organic compounds may be used in combination of two or more kinds thereof.

In the nanoparticle dispersion liquid, a compound other than the nanoparticle/dispersant complex and the dispersion medium may be contained within the range in which aggregation or coloring does not take place.

In the nanoparticle/matrix-material complex according to the present invention, the nanoparticle/dispersant complex is dispersed into a matrix material.

The matrix material of the present invention is not particularly limited as long as the matrix material is a solid material that disperses the nanoparticle/dispersant complex thereinto.

The matrix material is preferably a resin. Use of such a matrix material in the nanoparticle/matrix-material complex facilitates compatibilization with the nanoparticle/dispersant complex of the present invention, and hence, it becomes easier to suppress the aggregation of the nanoparticles, whereby a nanoparticle/matrix-material complex having high transparency can be produced.

Examples of the matrix material include: (meth)acrylic polymers such as poly(methyl(meth)acrylate), poly(ethyl (meth)acrylate), poly(butyl(meth)acryalte), poly(cyclohexyl (meth)acrylate), poly(isobornyl (meth)acrylate), poly(phenyl (meth)acrylate), poly(benzyl (meth)acrylate), poly(2-ethylhexyl(meth)acrylate), and poly(2-hydroxyethyl(meth) acrylate); vinyl polymers such as poly(vinyl acetate), poly (vinyl propionate), poly(vinyl phthalimide), poly(vinyl pyrrolidone), poly(vinyl carbazole), and polystyrene; and optical polymers such as polycarbonate, a cyclic olefin polymer, polyolefin, polysulfone, polyethersulfone, polyarylate, polyester, polyimides, and an epoxy resin.

Those matrix materials may be used in combination of two or more kinds thereof, as a copolymer, a polymer blend, or a polymer alloy.

In the nanoparticle/matrix-material complex, a compound other than the nanoparticle/dispersant complex and the matrix material may be contained within the range in which aggregation or coloring does not take place.

The content of the nanoparticle/dispersant complex in the nanoparticle/matrix-material complex according to the present invention is preferably 0.01 vol % or more to 99 vol % or less and more preferably 0.01 vol % or more to 70 vol % or less.

Next, a first production method for a nanoparticle/dispersant complex and a second production method for a nanoparticle/dispersant complex according to the present invention are described.

The first production method for a nanoparticle/dispersant complex according to the present invention comprises forming, under a presence of at least one dispersant represented by the formula (1) or (2), a nanoparticle covered with the dispersant from a nanoparticle precursor.

The nanoparticle precursor of the present invention is not particularly limited as long as it can be used as a raw material of the nanoparticle. Examples thereof include inorganic compounds such as halides, sulfates, nitrates, and hydroxides, and organic metal complexes such as acetates and alkoxides. Note that, those may be hydrolyzed partially. In addition, two or more kinds of them may be used in combination.

Specific examples of the nanoparticle precursor include titanium chloride, titanium bromide, titanium iodide, titanium sulfate, titanium nitrate, titanium hydroxide, titanium acetate, titanium methoxide, titanium ethoxide, titanium isopropoxide, titanium butoxide, bis(acetylacetonato)titanium oxide, titanium chloride triisopropoxide, titanium oxide chloride, and substances obtained by replacing the titanium metal species in the above compounds with zirconium, aluminum, niobium, tin, antimony, zinc, silicon, indium, lanthanium, cerium, hafnium, and the like.

The ratio of the nanoparticle precursor to the dispersant represented by the formula (1) or (2), those of which are used in the production method for a nanoparticle/dispersant complex of the present invention, is as follows. With respect to the nanoparticle precursor, the content of the dispersant is preferably 0.001-fold mole or more to 100-fold mole or less and more preferably 0.01-fold mole or more to 10-fold mole or less. When the ratio is set to the above range, the surface of the nanoparticle precursor is moderately covered with the dispersant, whereby, after nanoparticles are formed, the dispersibility of the nanoparticles contained in a dispersion medium or a matrix material may be improved.

In the production method, the formation of a nanoparticle covered with the dispersant from a nanoparticle precursor is preferably performed by an in-situ synthesis method. The in-situ synthesis method involves forming nanoparticles while covering the nanoparticle precursor with the dispersant.

When the in-situ synthesis method is used, before the nanoparticles, which easily aggregate, are formed, the nanoparticles can be covered with the dispersant, and hence, nanoparticles each having a small particle diameter can be easily formed. Accordingly, the transparency of the nanoparticle dispersion liquid and the nanoparticle/matrix-material complex can be improved.

In the present invention, the nanoparticle is preferably generated from the nanoparticle precursor by applying energy to the nanoparticle precursor.

Further, the nanoparticle is preferably generated from the nanoparticle precursor by irradiating the nanoparticle precursor with a microwave. When those processes are carried out, the rapid rise in temperature and the reduction in reaction time are facilitated.

The microwave generally refers to an electromagnetic wave having a frequency of 300 MHz to 3 THz, and the frequency used in the present invention is not particularly limited as long as the frequency is in the above range. For industrial applications, the frequency to be used is preferably within the Industrial Scientific Medical (ISM) band and more preferably 2.45 GHz.

The microwave irradiation intensity is preferably 0.1 to 50 W/cm³. When the irradiation intensity is more than 0.1 W/cm³, it becomes easier to increase temperature up to a reaction temperature. Further, when the irradiation intensity is less than 50 W/cm³, overshoot of the reaction temperature can be suppressed, and hence, the reaction temperature can be easily kept constant.

Note that the microwave irradiation method is not particularly limited. Examples thereof include constant output continuous irradiation, output-variable continuous irradiation, constant cycle pulse irradiation, cycle-variable pulse irradiation, and PID control irradiation.

In addition, as the second production method for a nanoparticle/dispersant complex of the present invention, there may be used a method comprising bringing a nanoparticle and at least one dispersant represented by the formula (1) or (2) into contact with each other so that the nanoparticle is covered with the dispersant.

Specifically, the nanoparticles and the dispersant are mixed and brought into contact with each other. In this case, a compound other than the nanoparticles and the dispersant may be contained in the mixture. Further, the method is not particularly limited, and is carried out by using, for example, a stirrer, a bead mill, a paint shaker, and a mixer. The process may also be performed while generating the nanoparticles each having a small particle diameter by loosening a nanoparticle aggregate.

Next, the phosphorus compound containing a nitrogen-containing aromatic heterocyclic cationic group of the present invention is described in detail.

The phosphorus compound containing a nitrogen-containing aromatic heterocyclic cationic group of the present invention (hereinafter may be abbreviated as "compound") is a compound represented by the following formula (3):

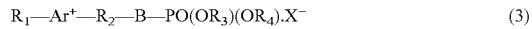
$$R_1\text{—}Ar^+\text{—}R_2\text{—}B\text{—}PO(OR_3)(OR_4).X^- \quad (3)$$

where $Ar^+$ represents a nitrogen-containing aromatic heterocyclic cationic group, B represents a single bond or an oxygen atom, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, $R_3$ represents a hydrogen atom or a substituted or unsubstituted alkyl group having 1 to 10 carbon atoms, $R_4$ represents a hydrogen atom or a substituted or unsubstituted alkyl group having 1 to 10 carbon atoms, and $X^-$ represents an anion produced by dissociation of a proton from a protonic acid.

Further, the phosphorus compound containing a nitrogen-containing aromatic heterocyclic cationic group of the present invention is a compound represented by the following formula (4). That is, the compound has the same structure as the compound represented by the formula (3) except that the above B represents a single bond.

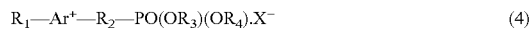
$$R_1\text{—}Ar^+\text{—}R_2\text{—}PO(OR_3)(OR_4).X^- \quad (4)$$

The nitrogen-containing aromatic heterocyclic cationic group is preferably an imidazolium cation.

As the B group of the compound represented by the formula (3), a single bond or an oxygen atom is preferred. The single bond represented by the B group as used herein means that the alkylene group ($R_2$) and the PO group are directly bonded with each other.

Examples of the nitrogen-containing aromatic heterocyclic cationic group ($Ar^+$) of the compound include an imidazolium group, a pyrazolium group, a triazolium group, and a pyridinium group. Each of those groups may be fused to form a ring.

As the $R_1$ group of the compound, a hydrogen atom or an alkyl group having 1 to 30 carbon atoms is preferred. Note that the alkyl group may be linear, branched, or cyclic, and may be unsubstituted or substituted with at least one substituent selected from a polymerizable group, a functional group, a halogen group, a hydrocarbon group, and the like. Further, a part of the skeleton of the alkyl group may contain at least one unsaturated group.

Specific examples of the $R_1$ group include a methyl group, an ethyl group, an n-propyl group, an i-propyl group, an n-butyl group, an i-butyl group, an s-butyl group, a t-butyl group, a hexyl group, a cyclohexyl group, a 2-ethylhexyl group, an octyl group, a decyl group, a dodecyl group, and a hexadecyl group.

As the $R_2$ group of the compound, a single bond or a substituted or unsubstituted alkylene group having 1 to 30 carbon atoms is preferred. The single bond represented by the $R_2$ group as used herein means that the nitrogen-containing aromatic heterocyclic cationic group ($Ar^+$) and the B group are directly bonded with each other. Note that the alkylene group may be linear, branched, or cyclic, and may be unsubstituted or substituted with at least one substituent selected from a polymerizable group, a functional group, a halogen group, a hydrocarbon group, and the like. Further, a part of the skeleton of the alkylene group may contain at least one unsaturated group.

Specific examples of the $R_2$ group include a methylene group, an ethylene group, a propylene group, a butylene group, a hexylene group, a cyclohexylene group, a 2-ethylhexylene group, an octylene group, a decylene group, a dodecylene group, and a hexadecylene group.

As the $R_3$ group and the $R_4$ group of the compound, a hydrogen atom or an alkyl group having 1 to 10 carbon atoms is preferred. Note that the alkyl group may be linear, branched, or cyclic, and may be unsubstituted or substituted with at least one substituent selected from a polymerizable group, a functional group, a halogen group, a hydrocarbon group, and the like. Further, a part of the skeleton of the alkyl group may contain at least one unsaturated group.

Specific examples of the $R_3$ group and the $R_4$ group include a hydrogen atom, a methyl group, an ethyl group, a propyl group, a butyl group, a hexyl group, a cyclohexyl group, a 2-ethylhexyl group, an octyl group, and a decyl group.

The structures of the $R_3$ group and the $R_4$ group may be the same or independent from each other.

The $X^-$ group of the compound is not particularly limited as long as $X^-$ represents an anion moiety of a protonic acid, and preferred is an anion moiety of a strong protonic acid. Specific examples of the $X^-$ group include: an anion moiety of a strong inorganic acid such as $Cl^-$, $Br^-$, $I^-$, $BF_4^-$, $PF_6^-$, $AsF_6^-$, or $SbF_6^-$; an anion moiety of sulfonic acid such as $CF_3SO_3^-$, $CF_3CF_2SO_3^-$, $CF_3(CF_2)_3SO_3^-$, $CF_3(CF_2)_7SO_3^-$, $CCl_3SO_3^-$, or $CH_3C_6H_4SO_3^-$; and an anion moiety of sulfonimide such as $(CF_3SO_2)_2N^-$.

Specific examples of the compound include a phosphonic-acid-group-containing imidazolium salt compound (3-(3-hexadecyl-1-imidazolio)-1-propanephosphonic acid bromide), a phosphoric-acid-group-containing imidazolium salt compound (3-(3-hexadecyl-1-imidazolio)-1-propanephosphoric acid bromide), a phosphonic-acid-group-containing pyrazolium salt compound (3-(2-hexadecyl-1-pyrazolio)-1-propanephosphonic acid bromide), a phosphoric-acid-group-containing pyrazolium salt compound (3-(2-hexadecyl-1-pyrazolio)-1-propanephosphoric acid bromide), a phosphonic-acid-group-containing triazolium salt compound (3-(3-hexadecyl-1-triazolio)-1-propanephosphonic acid bromide), a phosphoric-acid-group-containing triazolium salt compound (3-(3-hexadecyl-1-triazolio)-1-propanephosphoric acid bromide), a phosphonic-acid-group-containing pyridinium salt compound (3-(4-hexadecyl-1-pyridinio)-1-propanephosphonic acid bromide), and a phosphoric-acid-group-containing pyridinium salt compound (3-(4-hexadecyl-1-pyridinio)-1-propanephosphoric acid bromide).

The phosphorus compound containing a nitrogen-containing aromatic heterocyclic cationic group of the present invention represented by the formula (3) may be produced by reacting a compound represented by the following formula (5) with a compound represented by the following formula (6):

$$R_1-Ar \quad (5)$$

where Ar represents a nitrogen-containing aromatic heterocyclic group and $R_1$ represents a hydrogen atom or a substituted or unsubstituted alkyl group having 1 to 30 carbon atoms,

$$X-R_2-B-PO(OR_3)(OR_4) \quad (6)$$

where B represents a single bond or an oxygen atom, $R_2$ represents a single bond or a substituted or unsubstituted alkylene group having 1 to 30 carbon atoms, $R_3$ represents a hydrogen atom or a substituted or unsubstituted alkyl group having 1 to 10 carbon atoms, $R_4$ represents a hydrogen atom or a substituted or unsubstituted alkyl group having 1 to 10 carbon atoms, and X represents a group capable of becoming an anion moiety of a protonic acid as $X^-$.

Further, the phosphorus compound containing a nitrogen-containing aromatic heterocyclic cationic group of the present invention represented by the formula (4) can be produced by reacting a compound represented by the following formula (5) with a compound represented by the following formula (7).

$$R_1-Ar \quad (5)$$

$$X-R_2-PO(OR_3)(OR_4) \quad (7)$$

The formula (7) is the same as the formula (6) except that B in the formula (6) represents a single bond.

Still further, in the phosphorus compound containing a nitrogen-containing aromatic heterocyclic cationic group of the present invention represented by the formula (3), in the case where the nitrogen-containing aromatic heterocyclic cationic group is an imidazolium cation, the compound may be produced by reacting a compound represented by the following formula (8) with a compound represented by the following formula (6):

$$R_1-Im \quad (8)$$

where Im represents an imidazole group and $R_1$ represents a hydrogen atom or a substituted or unsubstituted alkyl group having 1 to 30 carbon atoms.

$$X-R_2-B-PO(OR_3)(OR_4) \quad (6)$$

Examples of the nitrogen-containing aromatic heterocyclic group (Ar) of the compound represented by the formula (5) include an imidazole group, a pyrazole group, a triazole group, and a pyridine group. Each of those groups may be fused to form a ring.

The options for the $R_1$ group, the B group, the $R_2$ group, the $R_3$ group, and the $R_4$ group of the compound represented by the formula (6) are, as described in page 25, line 23 to page 28, line 9, the same as the options exemplified for the compound represented by the formula (3) which is synthesized with the compound represented by the formula (6).

The X group of the compound is not particularly limited as long as the X group represents a group capable of becoming an anion moiety of a protonic acid as $X^-$, and preferred is a group capable of becoming an anion moiety of a strong protonic acid. Specific examples of the X group include: a group capable of becoming an anion moiety of an inorganic strong acid, such as Cl, Br, I, $BF_4$, $PF_6$, $AsF_6$, or $SbF_6$; a group capable of becoming an anion moiety of sulfonic acid, such as $CF_3SO_3$, $CF_3CF_2SO_3$, $CF_3(CF_2)_3SO_3$, $CF_3(CF_2)_7SO_3$, $CCl_3SO_3$, or $CH_3C_6H_4SO_3$; and a group which may become an anion moiety of sulfone imide such as $(CF_3SO_2)_2N$.

A compound represented by the formula (5), which is a synthetic raw material of the compound (3) or (4), may be synthesized easily from a nitrogen-containing aromatic heterocyclic compound and an alkyl bromide with reference to the documents of, for example, T. G. Traylor et al., J. Am. Chem. Soc., 115, 4808-4813 (1993) and Y. R. Mirzaei et al., J. Org. Chem., 9340-9345 (2002).

A compound represented by the formula (6), which is another raw material of the compound (3) or (4), may be synthesized easily from a dibromoalkane and a phosphotriester with reference to the documents of, for example, C. E. Dreef et al., Tetrahedron Lett., 29, 1199-1202 (1988) and Y. Segall et al., J. Agric. Food Chem., 39, 380-385 (1991).

In the production method including reacting the compound represented by the formula (5) with the compound represented by the formula (6), the use amount of the compound represented by the formula (5) is preferably 0.1 mol or more and 10 mol or less and more preferably 0.5 mol or more and 3 mol or less with respect to 1 mol of the compound represented by the formula (6).

In the production method including reacting the compound represented by the formula (5) with the compound represented by the formula (7), the use amount of the compound represented by the formula (5) is preferably 0.1 mol or more and 10 mol or less and more preferably 0.5 mol or more and 3 mol or less with respect to 1 mol of the compound represented by the formula (7).

In the production method including reacting the compound represented by the formula (8) with the compound represented by the formula (6), the use amount of the compound represented by the formula (8) is preferably 0.1 mol or more and 10 mol or less and more preferably 0.5 mol or more and 3 mol or less with respect to 1 mol of the compound represented by the formula (6).

The reaction may not particularly use a solvent, and may be performed in a solvent if required. The reaction solvent is not particularly limited as long as the reaction solvent does not participate in the reaction, and examples thereof include: aromatic hydrocarbons such as benzene, toluene, xylene, and mesitylene; aliphatic hydrocarbons such as hexane, cyclohexane, octane, and decane; and ethers such as tetrahydrofuran, dioxane, diethyl ether, t-butyl methyl ether, and dimethoxyethane.

Those solvents may be used in combination of two or more kinds thereof.

In general, the reaction temperature can be up to the boiling point of a solvent to be used, and is in a range of preferably 100° C. to 300° C., more preferably 120° C. to 250° C., and still more preferably 140° C. to 220° C.

The reaction time depends on the reactivity of a substrate, and is 0.1 to 500 hours. A reaction liquid is analyzed by high performance liquid chromatography or gas chromatography to follow the progress of the reaction, whereby the end point of the reaction can be determined. In general, the reaction time is 1 to 240 hours.

In the reaction liquid, a compound other than the reactive substrate and the solvent may be contained in such a range that the progress of the reaction is not inhibited.

After the completion of the reaction, the phosphorus compound containing a nitrogen-containing aromatic heterocyclic cationic group, which is the target compound, may be isolated by the filtration, extraction, distillation, recrystallization, or chromatography of a reaction precipitate (product).

EXAMPLES

Hereinafter, the present invention is described in more detail by way of examples, but the present invention is not limited to the following examples.

<Production Method for Dispersant>

Typical synthesis methods for a dispersant of the present invention are shown below. The dispersants which are not given here are also synthesized in the same manner.

(Production Method for N-Hexadecylimidazole)

N-hexadecylimidazole was synthesized from imidazole and hexadecyl bromide with reference to the document (T. G. Traylor et al., J. Am. Chem. Soc., 115, 4808-4813 (1993)).

Synthesis Example 1

Production method for 3-(3-hexadecyl-1-imidazolio)-1-propanesulfonate (M-1)

3-(3-hexadecyl-1-imidazolio)-1-propanesulfonate (M-1) represented by the following chemical formula (M-1) was synthesized with reference to the document (M. Yoshizawa et al., J. Mater. Chem., 11, 1057-1067 (2001)).

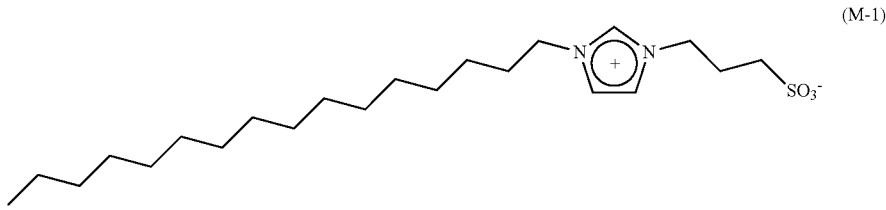

12.3 g of N-hexadecylimidazole was dissolved in 80 ml of acetone, and the mixture was cooled in an ice-water bath. Into the resultant, a solution in which 5.13 g of 1,3-propanesultone was dissolved in 80 ml of acetone was dripped, and after the dripping was completed, the resultant was stirred at room temperature. After the completion of the reaction, the resultant was filtered to obtain a precipitate. The precipitate was dried under reduced pressure, whereby 15.4 g of 3-(3-hexadecyl-1-imidazolio)-1-propanesulfonate (M-1) represented by the chemical formula (M-1) was obtained.

Synthesis Example 2

Production method for 3-(3-hexadecyl-1-imidazolio)-1-propanesulfonic acid triflate (M-2)

3-(3-hexadecyl-1-imidazolio)-1-propanesulfonic acid triflate (M-2) represented by the following chemical formula (M-2) was synthesized with reference to the document (A. C. Cole et al., J. Am. Chem. Soc., 124, 5962-5963 (2002)).

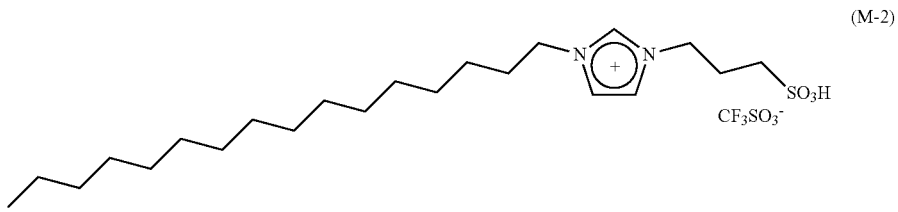

4.15 g of 3-(3-hexadecyl-1-imidazolio)-1-propanesulfonate (M-1) and 1.67 g of trifluoromethanesulfonic acid were dissolved in 50 ml of toluene, and the mixture was stirred at 60° C. for 3 hours. After the completion of the reaction, the resultant was filtered to obtain a precipitate. The precipitate was dried under reduced pressure, whereby 5.32 g of 3-(3-hexadecyl-1-imidazolio)-1-propanesulfonic acid triflate (M-2) represented by the chemical formula (M-2) was obtained.

<Production Method for Nanoparticle/Dispersant Complex and Nanoparticle Dispersion Liquid>

Example 1

0.20 g (0.49 mmol) of 3-(3-hexadecyl-1-imidazolio)-1-propanesulfonate (M-1) was dissolved in 36 ml of 1-butanol (BuOH), and the mixture was cooled in an ice-water bath. Into the resultant, 5.8 ml of concentrated hydrochloric acid and 3.4 ml (18 mmol) of $TiCl_3OH$ (concentration: 5.3 M, manufactured by Wako Pure Chemical Industries, Ltd.) were each slowly dripped, whereby a colorless transparent mixed liquid was obtained. The temperature of the mixed liquid was rapidly raised to 70° C. by using a microwave reactor (Discover LabMate manufactured by CEM Corporation) while adjusting the output of the microwave at maximum of 30 W (0.7 W/cm$^3$), and after the temperature became constant, the mixed liquid was irradiated with the microwave for 60 minutes. After being left to cool, a trace amount of white precipitate was removed, whereby a $TiO_2$ nanoparticle dispersion liquid was obtained.

Further, the dispersion medium was distilled off from the $TiO_2$ nanoparticle dispersion liquid, whereby a high-concentration $TiO_2$ nanoparticle dispersion liquid was obtained.

Still further, the high-concentration $TiO_2$ nanoparticle dispersion liquid was dried under reduced pressure, whereby a nanoparticle/dispersant complex powder was obtained.

Example 2

A nanoparticle dispersion liquid and a nanoparticle/dispersant complex powder were obtained in the same manner as in Example 1, except that 0.15 g (0.49 mmol) of 3-(3-octyl-1-imidazolio)-1-propanesulfonate (M-3) instead of M-1 was used as the dispersant.

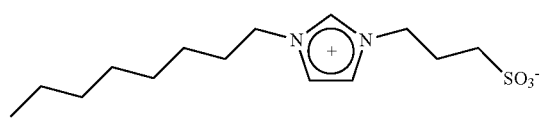

(M-3)

Example 3

A nanoparticle dispersion liquid and a nanoparticle/dispersant complex powder were obtained in the same manner as in Example 1, except that 0.28 g (0.49 mmol) of 3-(3-hexadecyl-1-imidazolio)-1-propanesulfonic acid triflate (M-2) instead of M-1 was used as the dispersant.

Example 4

A nanoparticle dispersion liquid and a nanoparticle/dispersant complex powder were obtained in the same manner as in Example 1, except that 0.20 g (0.49 mmol) of 4-(3-butyl-1-imidazolio)-1-butanesulfonic acid triflate (M-4) instead of M-1 was used as the dispersant.

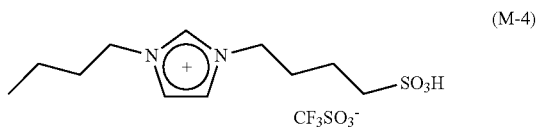

(M-4)

Example 5

A nanoparticle dispersion liquid and a nanoparticle/dispersant complex powder were obtained in the same manner as in Example 1, except that 0.15 g (0.49 mmol) of 4-(3-(2-ethylhexyl-1-imidazolio)-1-butanesulfonate (M-5) instead of M-1 was used as the dispersant.

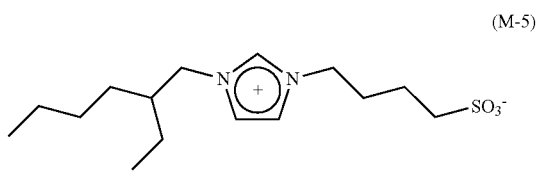

(M-5)

Example 6

A nanoparticle dispersion liquid and a nanoparticle/dispersant complex powder were obtained in the same manner as in Example 1, except that 0.24 g (0.49 mmol) of 3-(3-hexadecyl-1-imidazolio)-1-propanephosphonic acid bromide (M-6) instead of M-1 was used as the dispersant.

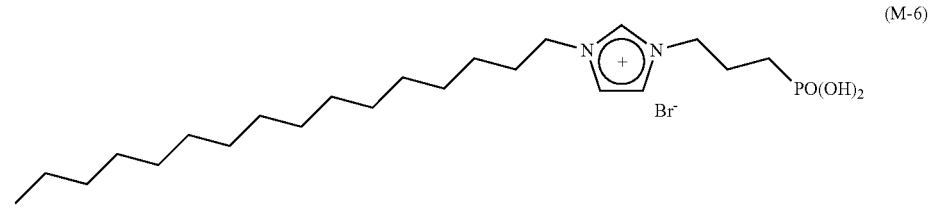

(M-6)

Example 7

A nanoparticle dispersion liquid and a nanoparticle/dispersant complex powder were obtained in the same manner as in Example 1, except that 0.21 g (0.49 mmol) of 2-(3-hexadecyl-1-imidazolio)-1-ethanephosphonic acid chloride (M-7) instead of M-1 was used as the dispersant.

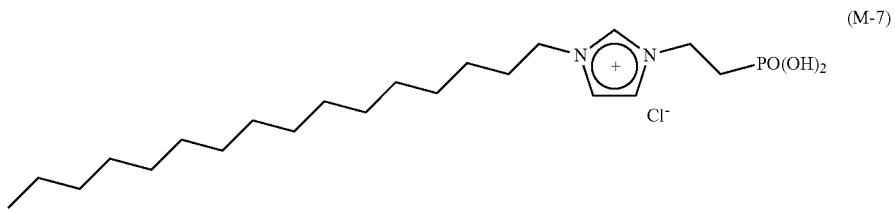

(M-7)

Example 8

A nanoparticle dispersion liquid and a nanoparticle/dispersant complex powder were obtained in the same manner as in Example 1, except that 3.7 ml (19 mmol) of $TiOCl_2$—$(HCl)_x$ (concentration: 5.0 M, manufactured by Fluka Co.) instead of $TiCl_3OH$ was used as the nanoparticle precursor.

Example 9

A nanoparticle dispersion liquid and a nanoparticle/dispersant complex powder were obtained in the same manner as in Example 1, except that 36 ml of 2-hydroxyethyl methacrylate (HEMA) instead of 1-butanol was used as the dispersion medium and that the maximum output of the microwave was set to 60 W (1.3 W/cm$^3$).

Example 10

A nanoparticle dispersion liquid and a nanoparticle/dispersant complex powder were obtained in the same manner as in Example 1, except that the heating was performed by using an oil bath instead of the microwave as an energy source.

Comparative Example 1

A nanoparticle dispersion liquid and a nanoparticle/dispersant complex powder were obtained in the same manner as in Example 1, except that 0.16 g (0.49 mmol) of dodecylbenzenesulfonic acid (DBSA) instead of M-1 was used as the dispersant.

Comparative Example 2

A nanoparticle dispersion liquid and a nanoparticle/dispersant complex powder were obtained in the same manner as in Example 1, except that 0.17 g (0.49 mmol) of 1-methyl-3-(10-carboxydecyl)imidazolium bromide (MCDIB) instead of M-1 was used as the dispersant.

Example 11

0.20 g (0.49 mmol) of 3-(3-hexadecyl-1-imidazolio)-1-propanesulfonate (M-1) as a dispersant was dissolved in 30 ml of butanol. Into the resultant, 1.0 g (2.5 mmol) of a $TiO_2$ nanoparticle water-dispersion liquid (average particle diameter: 13 nm, concentration: 20 wt %) was dripped, followed by stirring for 1 hour. A trace amount of white precipitate was removed, whereby a nanoparticle dispersion liquid was obtained. A high-concentration nanoparticle dispersion liquid and a nanoparticle/dispersant complex powder were obtained in the same manner as in Example 1.

Example 12

A nanoparticle dispersion liquid and a nanoparticle/dispersant complex were obtained in the same manner as in Example 11, except that 2.0 g (1.6 mmol) of a $ZrO_2$ nanoparticle water-dispersion liquid (average particle diameter: 2 nm, concentration: 10 wt %) was used instead of the $TiO_2$ nanoparticle water-dispersion liquid as the water-dispersion liquid.

Example 13

7.2 g (17 mmol) of 3-(3-hexadecyl-1-imidazolio)-1-propanesulfonate (M-1) as a dispersant were dissolved in 57.6 g of butanol. To the resultant, 7.2 g (71 mmol) of an $Al_2O_3$ powder (aggregate having an average primary particle diameter of 7 nm) were added, and then bead mill dispersion was performed for 3 hours. The beads and a trace amount of white substance were removed, whereby a nanoparticle dispersion liquid was obtained. A high-concentration nanoparticle dispersion liquid and a nanoparticle/dispersant complex powder were obtained in the same manner as in Example 1.

Comparative Example 3

A nanoparticle dispersion liquid and a nanoparticle/dispersant complex powder were obtained in the same manner as in Example 11, except that 0.16 g (0.49 mmol) of dodecylbenzenesulfonic acid (DBSA) instead of M-1 was used as the dispersant.

<Production Method of Nanoparticle/Matrix-Material Complex>

Hereinafter, an example of a synthesis method of the nanoparticle/matrix-material complex of the present invention is described.

Example 14

7 mg of IRGACURE 184 (manufactured by NAGASE & CO., LTD.) was dissolved in 0.5 g of a dispersion liquid obtained by removing water from the nanoparticle dispersion liquid of Example 9. After removing the dissolved oxygen, the resultant was irradiated with light of 30 mW/cm$^2$ for 1 minute by using an ultraviolet irradiation apparatus (EX250-W manufactured by HOYA-SCHOTT). The obtained nanoparticle/matrix-material complex (thickness: about 1 mm) was colorless and transparent.

<Method of Measuring Particle Diameter of Nanoparticle>

The particle diameters (volume average particle diameters) of nanoparticles contained in the obtained nanoparticle dispersion liquids in examples and comparative examples were measured by using a particle diameter measurement apparatus ("Zetasizer Nano S" manufactured by Malvern Instruments Ltd.) by dynamic light scattering. Table 1 shows the results.

Table 1 shows the content and the evaluation result of each of examples and comparative examples.

TABLE 1

| | Dispersant | Nanoparticle precursor or nanoparticle | Dispersion medium | Acid | Energy source | Volume average particle diameter (nm) | Low-concentration nanoparticle dispersion liquid | | High-concentration nanoparticle dispersion liquid | |
|---|---|---|---|---|---|---|---|---|---|---|
| | | | | | | | Transparency | Coloring suppression | Transparency | Coloring suppression |
| Example 1 | M-1 | TiCl$_3$OHaq. | BuOH | HClaq. | MW | 2.8 | A | A | A | A |
| Example 2 | M-3 | TiCl$_3$OHaq. | BuOH | HClaq. | MW | 3.5 | A | A | A | A |
| Example 3 | M-2 | TiCl$_3$OHaq. | BuOH | HClaq. | MW | 2.8 | A | A | A | A |
| Example 4 | M-4 | TiCl$_3$OHaq. | BuOH | HClaq. | MW | 2.6 | A | A | A | A |
| Example 5 | M-5 | TiCl$_3$OHaq. | BuOH | HClaq. | MW | 4.0 | A | A | A | A |
| Example 6 | M-6 | TiCl$_3$OHaq. | BuOH | HClaq. | MW | 3.2 | A | A | A | A |
| Example 7 | M-7 | TiCl$_3$OHaq. | BuOH | HClaq. | MW | 3.6 | A | A | A | A |
| Example 8 | M-1 | TiOCl$_2$—(HCl)$_x$aq. | BuOH | HClaq. | MW | 3.2 | A | A | A | A |
| Example 9 | M-1 | TiCl$_3$OHaq. | HEMA | HClaq. | MW | 1.4 | A | A | A | A |
| Example 10 | M-1 | TiCl$_3$OHaq. | BuOH | HClaq. | Oil bath | 2.9 | A | A | A | A |
| Comparative Example 1 | DBSA | TiCl$_3$OHaq. | BuOH | HClaq. | MW | 2.8 | A | A | B | B |
| Comparative Example 2 | MCDIB | TiCl$_3$OHaq. | BuOH | HClaq. | MW | 3.4 | A | B | A | C |
| Example 11 | M-1 | TiO$_2$ water-dispersion liquid | BuOH | None | None | 30.6 | B | A | B | A |
| Example 12 | M-1 | ZrO$_2$ water-dispersion liquid | BuOH | None | None | 5.5 | A | A | A | A |
| Example 13 | M-1 | Al$_2$O$_3$ powder | BuOH | None | None | 8.1 | B | A | B | A |
| Comparative Example 3 | DBSA | TiO$_2$ water-dispersion liquid | BuOH | None | None | 16.2 | B | A | B | B |

(Note)
(1) "Low-concentration nanoparticle dispersion liquid" represents a liquid in which about 5 wt % of nanoparticles are dispersed.
(2) "High-concentration nanoparticle dispersion liquid" represents a liquid in which about 30 wt % of nanoparticles are dispersed.
(3) The evaluation of transparency was performed by observing a sample having a thickness of 5 to 10 mm and then classifying the sample into one of the three levels: "A" (no turbidity is observed apparently); "B" (it seems that turbidity is possibly present); and "C" (turbidity is observed apparently).
(4) The evaluation of coloring suppression was performed by observing a sample having a thickness of 5 to 10 mm and then classifying the sample into one of the three levels: "A" (no coloring is observed apparently); "B" (it seems that coloring is possibly present); and "C" (coloring is observed apparently).

In Examples 1 to 10, the nanoparticle dispersion liquids which were colorless and transparent could be obtained not only when the liquids each contain nanoparticles at a low concentration but also when the liquids each contain nanoparticles at a high concentration (liquids being "concentrated liquids"). In Examples 11 to 13, although the particle diameters became slightly large because the nanoparticles were not formed by the in-situ synthesis method, the dispersion liquids having good transparency without coloring could be obtained. In Example 13, the nanoparticle aggregate is loosened to be nanoparticles, whereby the dispersion liquids having good transparency without coloring could be obtained. In Example 14, the colorless transparent high-concentration nanoparticle dispersion liquid of the present invention could be used and directly polymerized, whereby the colorless transparent nanoparticle/matrix-material complex could be obtained.

On the other hand, in Comparative Example 1, the dispersion liquid which was colorless and transparent could be obtained when the liquid contain nanoparticles at a low concentration, but in the case of the high-concentration dispersion liquid, there occurred slight white turbidity and coloring. It may be found that, according to the dispersant of the present invention, the excellent colorless transparency may be exhibited even at high concentrations. In Comparative Example 2, the dispersion liquid was excellent in transparency and dispersibility, but coloring occurred. In Comparative Example 3, the dispersion liquid had good transparency, but coloring occurred. It may be found that, according to the dispersant of the present invention, the excellent coloring suppression ability may be exhibited while maintaining the transparency even at high concentrations.

Example 15

1.46 g (5 mmol) of N-hexadecylimidazole and 1.01 g (5 mmol) of 3-bromopropylphosphonic acid were dissolved in 30 ml of toluene, and the mixture was refluxed for 84 hours. After the completion of the reaction, the resultant was filtered to obtain a precipitate and the precipitate was dried under reduced pressure, whereby 3-(3-hexadecyl-1-imidazolio)-1-propanephosphonic acid bromide (white powder, 1.00 g, 40% yield) represented by the following formula (9) was obtained.
Melting point 103° C.
$^1$H NMR (400 MHz, CDCl$_3$) δ 9.64 (s, 1H), 8.92 (s, 2H), 7.89 (s, 1H), 7.50 (s, 1H), 4.50 (t, 2H), 4.28 (t, 2H), 2.31-2.20 (m, 2H), 1.95-1.87 (m, 4H), 1.32-1.24 (m, 26H), 0.88 (t, 3H)

(9)

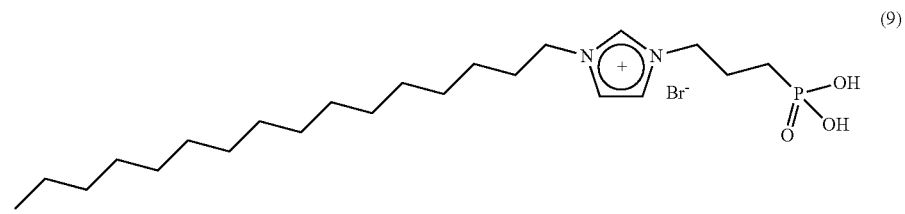

Example 16

5.00 g (17 mmol) of N-hexadecylimidazole and 2.47 g (17 mmol) of 2-chloroethylphosphonic acid were dissolved in 75 ml of o-xylene, and the mixture was refluxed for 78 hours.

After the completion of the reaction, the reaction liquid was concentrated and the resultant was purified by a flash column chromatography (methanol/water), whereby 2-(3-hexadecyl-1-imidazolio)-1-ethanephosphonic acid chloride represented by the following formula (10) was obtained. The structure thereof was confirmed by $^1$H NMR spectrum similar to that of Example 15.

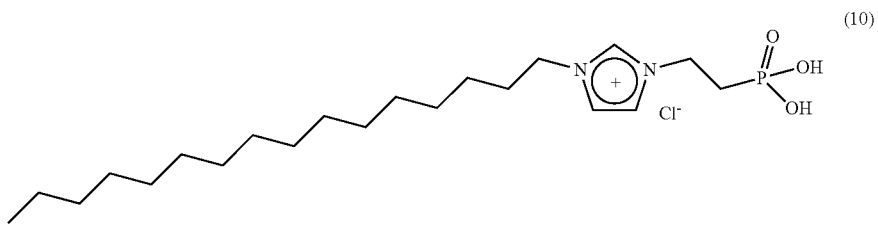

(10)

Example 17

3-(3-dodecyl-1-imidazolio)-1-propanephosphonic acid bromide represented by the following formula (II) was obtained in the same manner as in Example 16, except that 2.36 g (10 mmol) of N-dodecylimidazole and 2.03 g (10 mmol) of 3-bromopropylphosphonic acid were used as synthetic raw materials, 40 ml of toluene were used as a solvent, and that the mixture was refluxed for 74 hours. The structure thereof was confirmed by $^1$H NMR spectrum similar to that of Example 15.

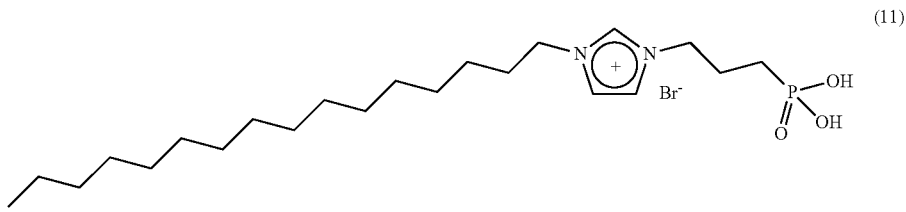

(11)

Example 18

3-(3-(2-ethylhexyl)-1-imidazolio)-1-propanephosphonic acid bromide represented by the following formula (12) was obtained in the same manner as in Example 17, except that 1.80 g (10 mmol) of N-(2-ethylhexyl)imidazole was used instead of N-dodecylimidazole as a synthetic raw material, and that the mixture was refluxed for 26 hours. The structure thereof was confirmed by $^1$H NMR spectrum similar to that of Example 15.

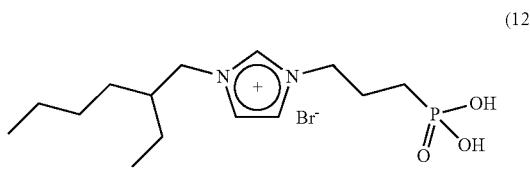

(12)

Example 19

3-(3-butyl-1-imidazolio)-1-propanephosphonic acid bromide represented by the following formula (13) was obtained in the same manner as in Example 17, except that 1.24 g (10 mmol) of N-butylimidazole was used instead of N-dodecylimidazole as a synthetic raw material, and that the mixture was refluxed for 25 hours. The structure thereof was confirmed by $^1$H NMR spectrum similar to that of Example 15.

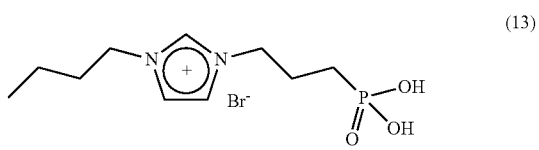

(13)

Example 20

4.39 g (15 mmol) of N-hexadecylimidazole was dissolved in 40 ml of toluene, and into this mixture, a solution in which 3.68 g (15 mmol) of diethyl(2-bromoethyl)phosphonate were dissolved in 40 ml of toluene was dripped at room temperature. After the dripping was completed, the resultant was refluxed for 86 hours. After the completion of the reaction, diethyl(2-(3-hexadecyl-1-imidazolio)-1-ethanephosphonate)bromide represented by the following formula (14) was obtained in the same manner as in Example 16. The structure thereof was confirmed by $^1$H NMR spectrum similar to that of Example 15.

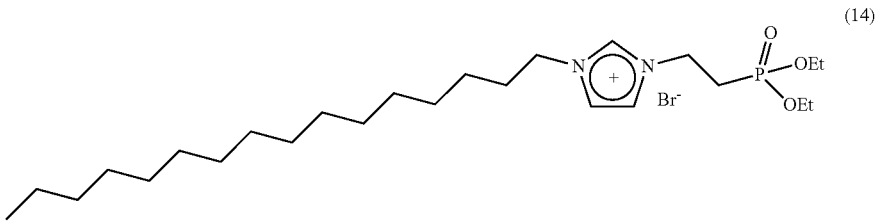

(14)

The nanoparticle and the nanoparticle/dispersant complex of the present invention may be utilized, by themselves or in the states of the dispersion liquid thereof and the matrix-material complex thereof, for various applications including an optical material, a liquid material having high refractive index, a photonic crystal material, a dielectric material, an electrode material, an electronic/semiconductor material, a solar battery material, a cosmetic material, a coloring material, a painting material, a coating material, and a catalyst material.

Further, according to the production method of the present invention, there may be easily and rapidly produced the nanoparticle/dispersant complex having excellent dispersibility and long-term stability in a dispersion medium, and the nanoparticle dispersion liquid and the nanoparticle/matrix-material complex which are colorless and transparent even at high concentrations.

The phosphorus compound containing a nitrogen-containing aromatic heterocyclic cationic group of the present invention may be utilized for various applications including a nanoparticle dispersant, a surface modifying agent, a surfactant, a resin additive, a flame retardant, an extractant, a medicine/agricultural chemical, an ionic liquid, an electrolyte solution, a lubricant, and a synthetic raw material.

The present invention is not limited to the above embodiments and various changes and modifications may be made within the spirit and scope of the present invention. Therefore to apprise the public of the scope of the present invention, the following claims are made.

This application claims the benefit of Japanese Patent Application No. 2008-194041, filed Jul. 28, 2008, and Japanese Patent Application No. 2009-158201, filed Jul. 2, 2009, which are hereby incorporated by reference herein in their entirety.

The invention claimed is:

1. A phosphorus compound represented by formula (3):

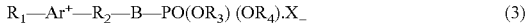

where $Ar^+$ represents an imidazolium cation, B represents a single bond or an oxygen atom, $R_1$ represents a hydrogen atom or a substituted or unsubstituted alkyl group having 1 to 30 carbon atoms, $R_2$ represents a single bond or a substituted or unsubstituted alkylene group having 1 to 30 carbon atoms, $R_3$ represents a hydrogen atom or a substituted or unsubstituted alkyl group having 1 to 10 carbon atoms, $R_4$ represents a hydrogen atom or a substituted or unsubstituted alkyl group having 1 to 10 carbon atoms, at least one of $R_3$ and $R_4$ represents a hydrogen atom, and $X^-$ represents an anion produced by dissociation of a proton from a protonic acid.

2. A nanoparticle/dispersant complex comprising a nanoparticle covered with a dispersant containing the phosphorus compound according to claim 1.

3. A nanoparticle dispersion liquid comprising the nanoparticle/dispersant complex according to claim 2 and a dispersion medium, wherein the nanoparticle/dispersant complex is dispersed in the dispersion medium.

4. A nanoparticle/matrix-material complex comprising the nanoparticle/dispersant complex according to claim 2 and a matrix material, wherein the nanoparticle/dispersant complex is dispersed in the matrix material.

* * * * *